(12) United States Patent
Horansky

(10) Patent No.: US 6,998,084 B2
(45) Date of Patent: Feb. 14, 2006

(54) CO-EXTRUDED PIGMENTED/CLEAR COATED POLYMERIC COATING FOR AN ARTICLE SUCH AS AUTOMOTIVE EXTERIOR BODY PANELS

(75) Inventor: John Horansky, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 424 days.

(21) Appl. No.: 10/014,537

(22) Filed: Oct. 26, 2001

(65) Prior Publication Data

US 2002/0114951 A1 Aug. 22, 2002

Related U.S. Application Data

(63) Continuation-in-part of application No. 09/785,407, filed on Feb. 16, 2001.

(51) Int. Cl.
*B29C 47/06* (2006.01)
*B32B 27/08* (2006.01)

(52) U.S. Cl. .............. 264/173.11; 264/173.12; 264/173.13; 264/173.16; 264/173.18; 156/244.11; 156/244.18; 156/244.19; 156/244.23

(58) Field of Classification Search ............ 156/244.11, 156/244.23, 244.18, 244.19; 264/173.11, 264/173.16, 173.13, 173.18, 173.12
See application file for complete search history.

(56) References Cited

U.S. PATENT DOCUMENTS

| | | | |
|---|---|---|---|
| 3,937,508 A | 2/1976 | Glance et al. | 293/63 |
| 3,979,540 A | 9/1976 | Moffett | 428/159 |
| 4,324,867 A | 4/1982 | Patton, Jr. et al. | 521/159 |
| 4,569,865 A | 2/1986 | Placek | 428/31 |
| 4,664,966 A | 5/1987 | Bailey et al. | 428/203 |
| 4,732,944 A | 3/1988 | Smith, Jr. | 525/329.9 |
| 4,748,206 A | 5/1988 | Nogiwa et al. | 525/88 |
| 4,810,540 A | 3/1989 | Ellison et al. | 428/31 |
| 4,906,703 A | 3/1990 | Bolton et al. | 525/329.9 |
| 4,945,005 A | 7/1990 | Aleckner, Jr. et al. | 428/500 |
| 4,997,720 A | 3/1991 | Bourbonais et al. | 428/500 |
| 5,026,448 A | 6/1991 | Reafler et al. | 156/212 |
| 5,079,084 A | 1/1992 | Kondo et al. | 428/324 |
| 5,132,148 A | 7/1992 | Reafler | 427/393.5 |
| 5,192,611 A | 3/1993 | Tomiyama et al. | 428/354 |
| 5,194,336 A | 3/1993 | Yamada | 428/421 |
| 5,202,180 A | 4/1993 | Watts | 428/324 |
| 5,215,826 A | 6/1993 | Shimanski et al. | 428/483 |
| 5,219,933 A | 6/1993 | Henton et al. | 525/66 |
| 5,288,806 A | 2/1994 | Peacock | 525/240 |
| 5,342,666 A | 8/1994 | Ellison et al. | 428/46 |
| 5,502,112 A | 3/1996 | Peacock | 525/240 |

(Continued)

FOREIGN PATENT DOCUMENTS

| | | |
|---|---|---|
| EP | 0 342 244 A1 | 11/1989 |
| EP | 0 343 877 A1 | 11/1989 |
| EP | 0 460 379 A1 | 12/1991 |
| EP | 0 562 166 A1 | 9/1993 |
| EP | 0 800 916 A2 | 10/1997 |
| JP | 002205451 | 4/2000 |
| WO | WO 01/78981 A1 | 10/2001 |

*Primary Examiner*—Monique R. Jackson
(74) *Attorney, Agent, or Firm*—Ralph E. Smith

(57) ABSTRACT

A colored coating for an article is provided including a first layer polymeric coating material with a transparent base which has been pigmented to a desired color and extruded, a second layer of transparent polymeric coating material which has been co-extruded with the first layer and a third layer of polymeric coating material co-extruded with the first layer opposite the second layer, the third layer being more opaque than the first layer. The invention, while having widespread application, is particularly suitable for use as a coating for an exterior surface of an automotive vehicle body panel.

17 Claims, 4 Drawing Sheets

U.S. PATENT DOCUMENTS

| | | | |
|---|---|---|---|
| 5,514,427 A | 5/1996 | Ellison et al. | 428/31 |
| 5,518,786 A | 5/1996 | Johnson et al. | 428/40.6 |
| 5,536,539 A | 7/1996 | Ellison et al. | 428/31 |
| 5,616,641 A | 4/1997 | Basch et al. | 524/417 |
| 5,653,927 A | 8/1997 | Flynn et al. | 264/134 |
| 5,681,897 A | 10/1997 | Silvis et al. | 525/150 |
| 5,688,866 A | 11/1997 | Silvis et al. | 525/127 |
| 5,707,697 A | 1/1998 | Spain et al. | 428/31 |
| 5,725,712 A | 3/1998 | Spain et al. | 156/230 |
| RE35,894 E | 9/1998 | Ellison et al. | 428/46 |
| 5,806,620 A | 9/1998 | DeRees et al. | 180/69.21 |
| 5,819,449 A | 10/1998 | Molson | 40/200 |
| RE35,970 E | 11/1998 | Ellison et al. | 428/31 |
| 5,856,406 A | 1/1999 | Silvis et al. | 525/240 |
| 5,861,463 A | 1/1999 | Sehanobish et al. | 525/240 |
| 5,866,658 A | 2/1999 | Talkowski | 525/183 |
| 5,916,643 A | 6/1999 | Spain et al. | 428/31 |
| 5,968,657 A | 10/1999 | Scullin et al. | 428/423.1 |
| 5,972,472 A | 10/1999 | Uschold et al. | 428/141 |
| 5,985,079 A | 11/1999 | Ellison | 156/244.23 |
| 5,985,198 A | 11/1999 | Harris et al. | 264/255 |
| 6,042,678 A | 3/2000 | Johnson et al. | 156/246 |
| 6,110,547 A | 8/2000 | Sano et al. | 428/31 |
| 6,284,183 B1 * | 9/2001 | Roys et al. | 264/345 |
| 2002/0055006 A1 * | 5/2002 | Vogel et al. | 428/520 |

* cited by examiner

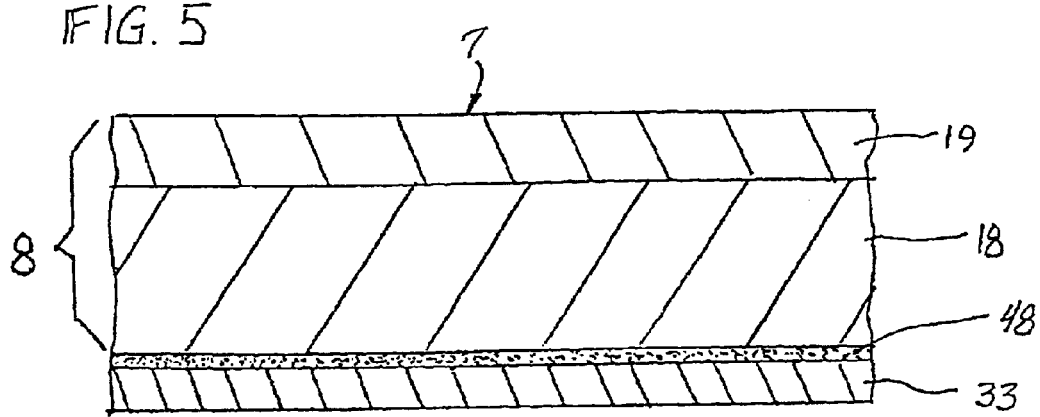
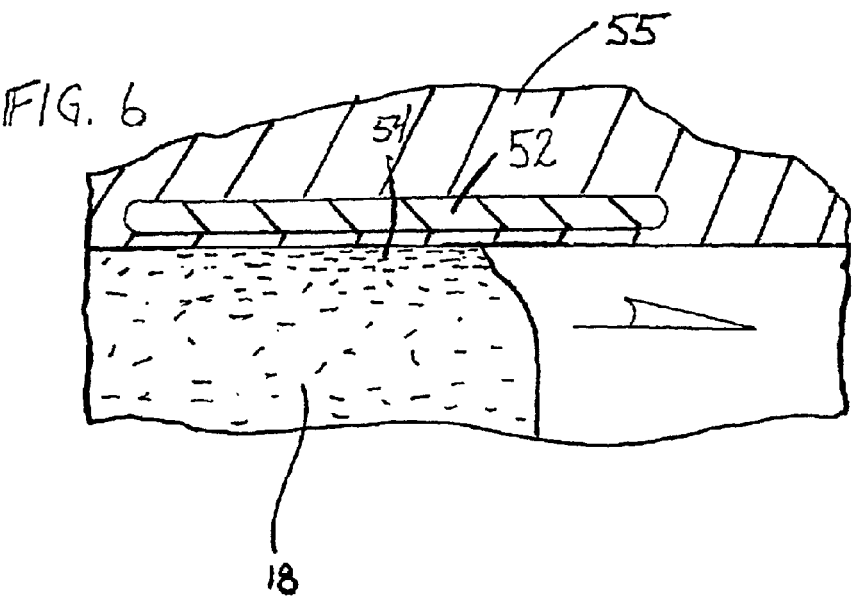

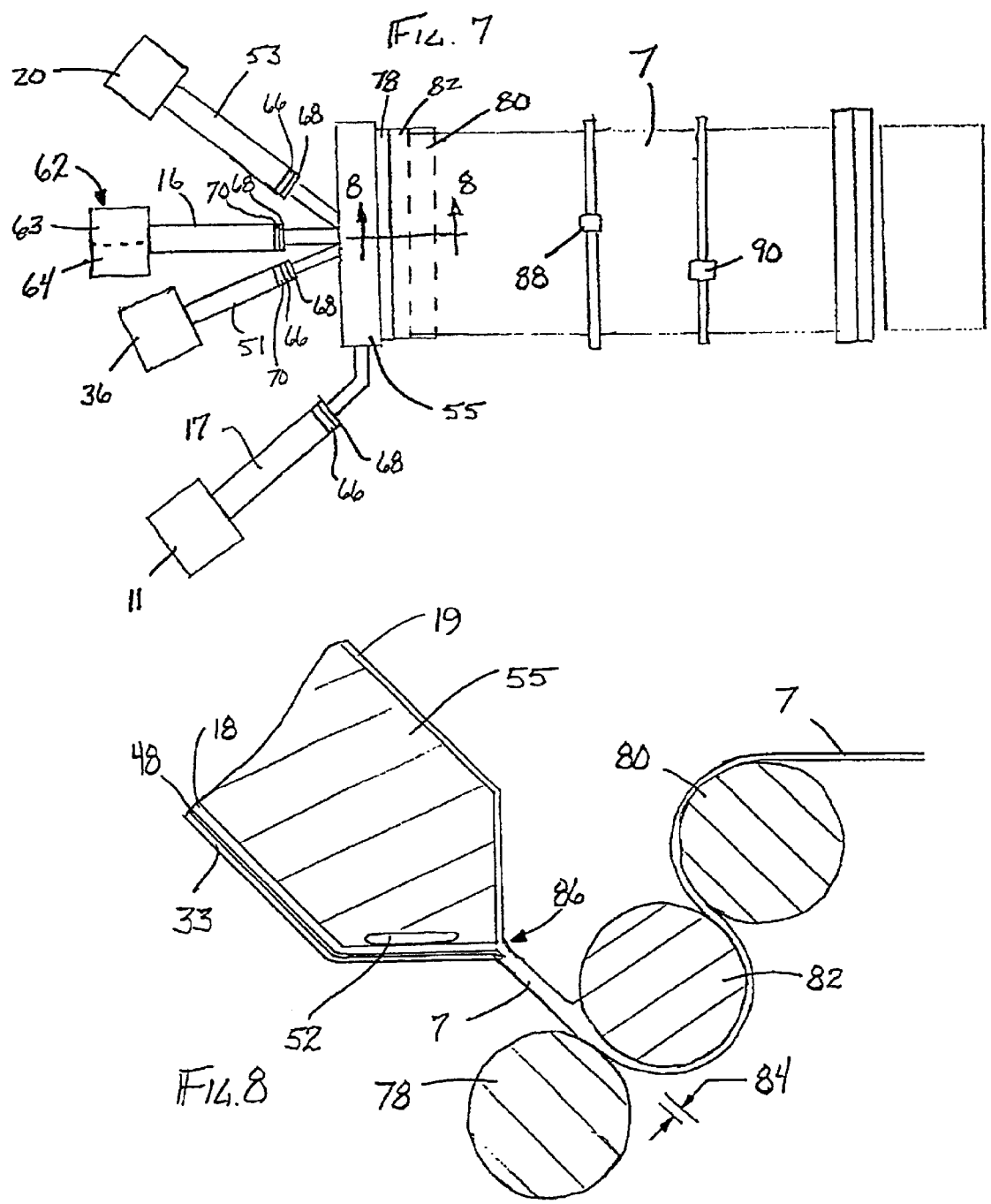

CO-EXTRUDED PIGMENTED/CLEAR COATED POLYMERIC COATING FOR AN ARTICLE SUCH AS AUTOMOTIVE EXTERIOR BODY PANELS

CROSS-REFERENCE TO RELATED APPLICATION

This application is a continuation-in-part of U.S. patent application Ser. No. 09/785,407, filed Feb. 16, 2001, the entire disclosure of the application is considered part of the disclosure of this application and is hereby incorporated by reference.

FIELD OF THE INVENTION

The present invention relates to a multi-layer polymeric coating. More particularly, the present invention in its most elementary form relates to a co-extruded polymeric coating for panels wherein the coating has a layer of the co-extrusion pigmented for color and another layer of polymeric coating to provide a clear coat.

BACKGROUND OF THE INVENTION

Several technical trends have developed in the past two decades to achieve increased fuel economy of automotive vehicles. One such trend is to decrease the weight of the vehicle. When a vehicle is traveling at highway speeds, up to one-half of the force needed to propel the vehicle forward is due to the aerodynamic drag of the vehicle rather than the vehicle weight. Therefore, if the aerodynamic drag of a vehicle can be lessened, a significant increase in fuel economy can be achieved.

To achieve the above-noted technical trends of weight reduction and the lowering of aerodynamic drag a new type of bumper has been developed. The new type of bumper, often referred to as a fascia, is fabricated from a polymeric material which is lighter than most metals. Prior bumpers were steel and extended outward from the remainder of the car body. Fascias are typically formed in rounded shapes that blend into the contour of the remainder of the vehicle body. The shape of the fascia lowers aerodynamic drag of the vehicle. Additionally, the fascia can materially add to the styling enhancement of the vehicle. Yet another advantage of the fascia is that its color can be selected to match the color of the remainder of the car body.

A so-called clear coat technique (sometimes referred to as two-coat one-bake technique) is used to cover metal body panels of most cars and light trucks. The clear coat technique comprises applying a metallic base paint composition, called a top coat, containing an optional metallic pigment, to a steel substrate. The steel substrate is provided in advance with undercoat and intermediate coat primers. Then, without curing the resulting top coat paint film, a clear paint composition is applied over the top coat in a wet-on-wet manner. The top coat and clear paint are then cured simultaneously.

Prior to the present invention, most fascias were injection molded. The molded fascias were then painted with a color coat to match the paint on the metal vehicle body. A second clear coat of paint was then applied to the fascia so that the appearance of the fascia would match that of the remainder of the vehicle body. The color utilized to paint the fascia sometimes had to be modified because the resultant color of cured paint on the injection molded fascia sometimes would differ from the color of the paint on a steel substrate. Therefore, trial and error was required to get the colors on the fascia to match the color of the remainder of the car body.

A prior method to cover the fascia substrate included using a painted polymeric sheet of material. A clear coat of material was laminated to the painted sheet by a spray, dip coating or adhesive technique. Additional layers of material may have been added for processing or to add strength. The polymeric sheet was back formed and the polymeric substrate was then injection molded into the back side of the back form.

In another prior method the color imparted to the sheet material by a pigment application rather than a painted application. The top clear coat was added as in the previously described method. Both methods often resulted in delamination during the back forming process when the sheet material was bent as it was formed to cover the curved fascia.

These deficiencies in the art of providing matched colors between a fascia and the remainder of the vehicle body are similarly present in other automotive and non-automotive applications. Accordingly, it is desirable to provide a coating for use with an article wherein the color of the coating may be readily matched to the remainder of the article. Additionally, it is desirable to provide a covering sheet for an automotive vehicle body panel, especially a bumper fascia, which has a top coat/clear coat appearance and which can be formed into complex shapes without suffering delamination. Specifically, it is desirable to provide a coating for a fascia or similar body panel which is readily color matched to another colored automotive vehicle body panel.

SUMMARY OF THE INVENTION

To make manifest the above-noted and other unfulfilled desires, the present invention is brought forth. In one preferred embodiment, the sheet material used as a coating includes a first polymeric clear layer, preferably an ionomer. The first layer is developed from a transparent base which has been pigmented to a desired color and the first layer is extruded. A second layer of polymeric material, also preferably an ionomer, is co-extruded with the first layer and engaging one side of the first layer. The second layer is transparent and typically will have a thickness which is generally a fraction of that of the pigmented first layer. A third opaque layer can also be provided. The third layer is co-extruded with the first layer and engages the second side of the first layer opposite the first side. The third layer is typically a polymer that is compatible with the ionomer material and a polymeric panel substrate which the coating is placed over to form a panel or fascia. In some applications the third layer will be opaque ethylene or polypropylene. The third layer is preferably pigmented like the first layer but made more opaque. The third layer may be either an off or an on color with respect to the color imparted to the first layer depending on the particular desired final color of the multi-layer assembly.

The third layer is provided for several purposes, including heat stability, mechanical stability, and appearance. For example, the third layer prevents undesirable visual effects, such as visual bleed-through, from the substrate to which the coating is applied. Secondly, the third layer may include added compatibilizers to allow the substrate to be molded behind the coating. Thirdly, the third layer can have an adhesive layer on its inward or outward exposed surface to allow it to be adhesively connected to the first layer or molded substrate, respectively. Fourthly, the third layer can be used (via pigments) to supplement a color of the first semitransparent layer.

As is further discussed below, the coating may be accurately color matched to an auto body panel and efficiently coupled to a structural panel or substrate to form the fascia. Various manufacturing techniques for applying the coating to the substrate are generally known and may be used with the invention, including vacuum forming the coating over a premolded metallic or polymeric body panel or, in an alternative embodiment, placing the coating within a mold and injecting a polymeric substrate behind it.

Accurate color matching of a panel with an extruded colored coating to other vehicle panels is important. Further, color matching is necessary both when viewing a coated panel straight-on (at a 90 degree angle) and when viewing the coated panel obliquely or flopped so the viewing angle is at another angle. The subject coating application relies on a semitransparent first layer to provide primary color match when the coated part is viewed straight-on and partially when the coated part is viewed at an angle or flopped. In addition, for certain low pigment content and high metallic colors, such as light almond and silver, where it is desirable to permit light to pass through the first and second layers and to a third or fourth layer to effectively color match, the third layer may be utilized for additional color influence of the multi-layer assembly for both normal viewing and for flop. The pigment loading and the thickness of the third layer effects the chromaticity of the colored part. For metallic colors, the transparency of the second layer maximizes the effect of metallics. The third layer's degree of pigment loading and degree of opaqueness effect the hiding power of the coated part. This also controls light penetration and tends to minimize color loss after the coating is formed about the substrate.

As rays of white light pass through the second clear coat layer and into the colored first layer, a portion of the rays strike pigment particles. Consequently, certain wave lengths of the white light are absorbed. The rest of the wave lengths of the white light characteristic of the desired color produced by the pigment are reflected back through the coating to the surface of the second layer. At the same time, other rays of the white light which do not strike pigment particles penetrate deeper into the semitransparent first layer and perhaps strike a deep down pigment particle. Depending on the thickness of the semitransparent layer, most of the light rays strike a pigment particle. Light penetration is stopped at the opaque third layer but light rays striking the pigment carried by the third layer is reflected back to the surface. No light rays are able to penetrate past the third layer and therefore the substrate cannot effect the effective color of the multi-layer assembly.

The above-noted and other objects of the present invention will become apparent to those skilled in the art from a review of the invention as it is provided in the accompanying drawings and detailed description of the preferred embodiment. Additional benefits and features of the invention will also be apparent from the description of a preferred process described herein for manufacturing the coating. The process, and corresponding machine, for extruding the coating includes various steps and components whereby the resulting coating satisfies stringent quality requirements contemplated by the applicant for commercial automobile body panel applications. For example, the described process and machine include the control of the moisture content of material (such as the transparent polymeric base material, pigments, metallics, and other additives), selective use of plates, screens, and/or mixers to control back pressure, increase mixing of the extruded materials, and generally increase the coating quality, and use of storage and transportation processes that improve the performance of the coating and/or film in subsequent manufacturing processes.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 5 is an enlarged side elevational view of a polymeric color coating sheet according to a second embodiment of the present invention.

FIG. 6 is a representative cross-section showing the flow profile of the first layer of polymeric material when a heater is used in the extruder die.

FIG. 7 is a top plan view of the preferred machine and corresponding process for manufacturing the coating.

FIG. 8 is a partial sectional view taken along the line 8—8 shown in FIG. 7.

DETAILED DESCRIPTION OF THE PREFERRED EMBODIMENT

Figure 1:
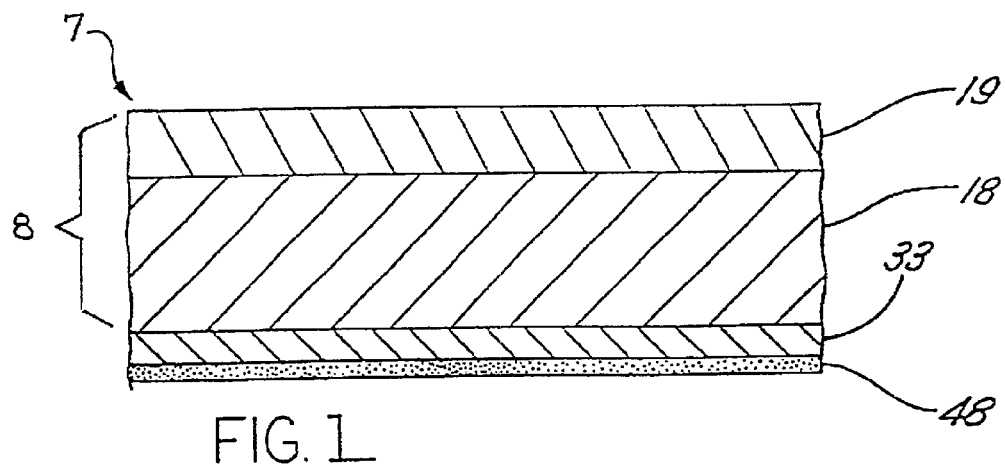
FIG. 1 is an enlarged side elevational view of a polymeric color coating sheet according to the present invention.

As is illustrated in the attached drawings, particularly FIGS. 1 and 5, the present invention is generally directed to a polymer coating 7 having a plurality or layers manufactured through a co-extrusion process. The coating is a non-painted substance that matches the painted surfaces on the exterior body of an article and is particularly suitable for use with a variety of vehicle body parts, including fascias. The coating provides an attractive appearance that closely simulates a clear coated and painted surface yet is substantially easier and cost effective to manufacture and apply to a variety of surfaces. Further, the coating is a durable and color matchable co-extrusion having good abrasion resistance, weathering properties, impact resistance, scratch and mar, and elongation characteristics. While the invention is illustrated and described herein for use with an automobile body part, those skilled in the art should appreciate that the invention has widespread application as a coating for numerous conventional colored bodies and conventional colored plastic articles including a variety of vehicles and non-vehicular applications such as, but not limited to, trucks, appliances, boats, telephones, computer covers, desktops, canoes, personal watercraft, airplanes, ships, and building structures.

With particular reference to FIGS. 1 and 5, the coating 7 includes multiple co-extruded layers, such as first and second layers 18 and 19, of a polymeric material. As is more fully explained below, the first and second layers 18 and 19 are co-extruded with one another and formed of compatible materials so as to form a bond between the first and second layers without the use of an adhesive. As a result, the present invention does not require the formation of separate sheets (through extrusion or otherwise) and the separate bonding of the sheets as is commonly used in lamination. While a variety of polymeric materials may be co-extruded to form the first and second layers 18 and 19 of the coating 7 in order to obtain some or even all of the desirable material properties discussed herein (such as acrylics, Polyvinylidene Fluoride (PVDF), urethanes, and polycarbonates), ionomers provide superior results relative to the above requirements, are cost effective, and are otherwise particularly suitable for forming a coating for exterior and interior vehicle panel applications. For purposes of this patent, the term "ionomer" means the polymer resulting from neutralization of an acrylic acid or methyl acrylic acid with an hydroxide such as, for example, sodium hydroxide, lithium hydroxide, calcium hydroxide, or zinc hydroxide. A variety of suitable ionomer resins are available in the art, including those manufactured or blended by DuPont (under the trade name Surlyn®), A. Shulman, Inc. (under the trade name Formion®), and Exxon (under the trade name Iotek®).

As noted, ionomers are particularly suitable for the first and second transparent layers 18 and 19 of the coating due, at least in part, to the scratch and mar resistance and transparency characteristics of these materials. It is desirable to form the first and second layers of the same base ionomer in order to enhance the compatibility and adhesion of these layers during co-extrusion. Moreover, forming both the first and second layers of the same ionomer enhances the color consistency of the coating. While ionomers having the desired scratch and mar resistance and transparency will be generally known from this description and are readily available to those skilled in the art, a sodium hydroxide neutralized acrylic or methyl acrylic acid having 60%–70% neutralization is preferred for the vehicle body fascia applications specifically illustrated and described herein. Sodium hydroxide neutralization provides cost savings over acids neutralized with lithium or zinc hydroxide. Additionally, the ionomer provides the desired performance characteristics including a clarity on the order of about 3.0 haze number or lower, second layer scratch and mar performance that is substantially equal or superior to the industry accepted performance of elastomeric paint measured by the scratch characteristics occurring from industry tests such as a Five-finger test or Taber test according to SAE standards (for example, a scratch standard of two or better produced by the seven Newton loaded finger in the Five-finger test is generally acceptable), and a surface gloss (measured in accordance with ASTM E284 or SAE J361) of at least about 85 degrees.

Before turning to a discussion of the co-extrusion process and material properties and characteristics of particular relevance during the process, it should be noted that while the layers of ionomer material are referenced herein as forming a film 8 having only two layers 18 and 19, the film 8 may include additional ionomer layers suitable for certain applications, particularly where metallic colors are desired.

As is shown in FIGS. 1 and 5, the coating 7 also preferably includes a third layer 33 (also referred to herein as a backing). An adhesive layer 48 may be disposed on the inner surface of the third layer 33 (FIG. 5) or between the third layer 33 and substrate (FIG. 1). The use and positioning of the adhesive layer 48 is principally dependent upon the compatibility of the first layer 18, third layer 33, and the article substrate. More particularly, an adhesive may be required if the adjacent layers are not sufficiently compatible with one another. Conversely, if the substrate is compatible with the third layer 33, no adhesive between the third layer 33 and substrate will likely be necessary. Additionally, if the first layer 18 and the third layer 33 are formed of compatible materials, the adhesive layer 48 illustrated in FIG. 5 may be omitted. Those skilled in the art will appreciate that the specific type of adhesive material may vary depending upon the type of backing, substrate, and/or polymeric film material. In the vehicle body panel application specifically described herein, a holding force of at least fifteen pounds per inch in a 90 degree pull off test on a one inch sample at 70° Fahrenheit is preferred. While a suitable adhesive will generally be apparent to those skilled in the art, the present invention contemplates use of a styrene or polypropylene based adhesive, most preferably a polypropylene base, that is compatible with the preferred ionomer film and polypropylene substrate described herein.

The third layer 33 is preferably co-extruded along with the first and second layers 18 and 19 and any desirable adhesive layer 48. The third layer 33 provides additional strength and shrink stability for the coating 7 and is preferably formed of a cost effective material that is sufficiently compatible with the first ionomer layer 18 as well as any substrate ultimately covered by the coating 7. In the vehicle body application particularly described herein, the third layer 33 has a stiffness greater than the extruded ionomer film 8, particularly at elevated temperatures such as over 180° Fahrenheit, so that the third layer limits shrinkage and softening of the coating when the third layer is exposed to elevated temperatures. While a variety of backing materials may be used for the third layer without departing from the scope of the invention defined by the appended claims, a polypropylene backing having a softening point of about 220–230° F. performs suitably in many applications, including for vehicle body parts. In general, it is desirable that the resulting coating, including the co-extruded first, second, adhesive, and third layers, exhibit an overall flexural modulus of approximately at least about 200 ksi and preferably 200–300 ksi or higher. Polypropylene exhibits the desired flexibility for application of the coating to the substrate and has a higher softening point than the described ionomers thereby providing additional stiffness under elevated temperature. Those skilled in the art will appreciate that talc or other additives may be provided to the polypropylene backing to further increase its stability. Further, while the third layer material and resulting properties discussed above are suitable for vehicle panels and fascia presently in use, those skilled in the art will appreciate that different third backing layer materials may be used to ensure compatibility with advancements or changes to panel and/or fascia substrates. Ultimately, as is described below, the backing or third layer 33 may be coupled to the substrate and preferably permits shaping, such as by vacuum forming, of the finished coating prior to placement on the substrate.

The co-extrusion process and additional material characteristics will now be described with reference to FIGS. 1, 2, 5, and 7 wherein the first material mixing tank 10 is provided to contain a first material supply. The first material mixing tank 10 contains a clear transparent base polymeric material, such as the above described ionomer. The transparent ionomer base material is pigmented to a desired color. A tank 12 supplies the pigment to the mixing tank 10. The pigment is color matched to the base coat used on the remainder of the car body. From the first material mixing tank 10, the ionomer is delivered to a screw barrel extruder 16 (FIGS. 2 and 7) which extrudes the first pigmented material at approximately 420° Fahrenheit to an extruder die 55 (FIG. 7). The screw barrel extruder 16 preferably provides a plurality of heated zones that may be maintained at different temperatures. In the illustrated embodiment, the zones range in temperature from about 355° F. at the upstream end to about 420–460°F. at the downstream zone. The thickness of first layer 18 will typically range from about 0.003 inches to about 0.012 inches. Thicknesses on the lower end of this range, on the order of about 0.003 inch, are preferred for mica impregnated color layers having high density metallic flakes, such as mica, so as to ensure proper visualization of the effects of the flakes which, due to their density, tend to collect in the lower portion of the color layer.

An optional feeder tank 28 provides reflective flakes and pigments to the first material tank 10. The reflective flakes are made from aluminum, mica, or other suitable material and provide the coating 7 with a reflective appearance. In the preferred embodiment of the extruding process and machine therefor shown in FIG. 7, a two-chamber hopper 62 is used to mix and supply the material for the first layer to the extruder 16 with the ionomer base material in a first chamber 63 and the pre-mixed and color-matched additive composition in a second chamber 64. The two-chambered hopper 62 communicates with the upstream end of the extruder 16 via a gravimetric feeder that controls the mixing of the materials. The color-matched composition in the second hopper chamber includes a carrier, metallic flakes, and pigment that has been previously color-matched to the body, preferably through the use of a small scale extrusion process substantially identical to the commercial extruder.

A second ionomer material tank 11 is provided. The second ionomer tank 11 contains an ionomer material that is similar or identical to that of the first material tank 10 and which has a clear transparent base. For purposes of this description, materials similar to the described ionomers include polymers that are compatible with ionomers and that exhibit acceptable characteristics, particularly transparency and scratch and mar resistance. By way of example rather than limitation, similar materials may include blends of ethylene and ionomer wherein the ionomer is the prevailing substrate mix, preferably though not necessarily in at least a 60% to 40% blend.

Figure 2:
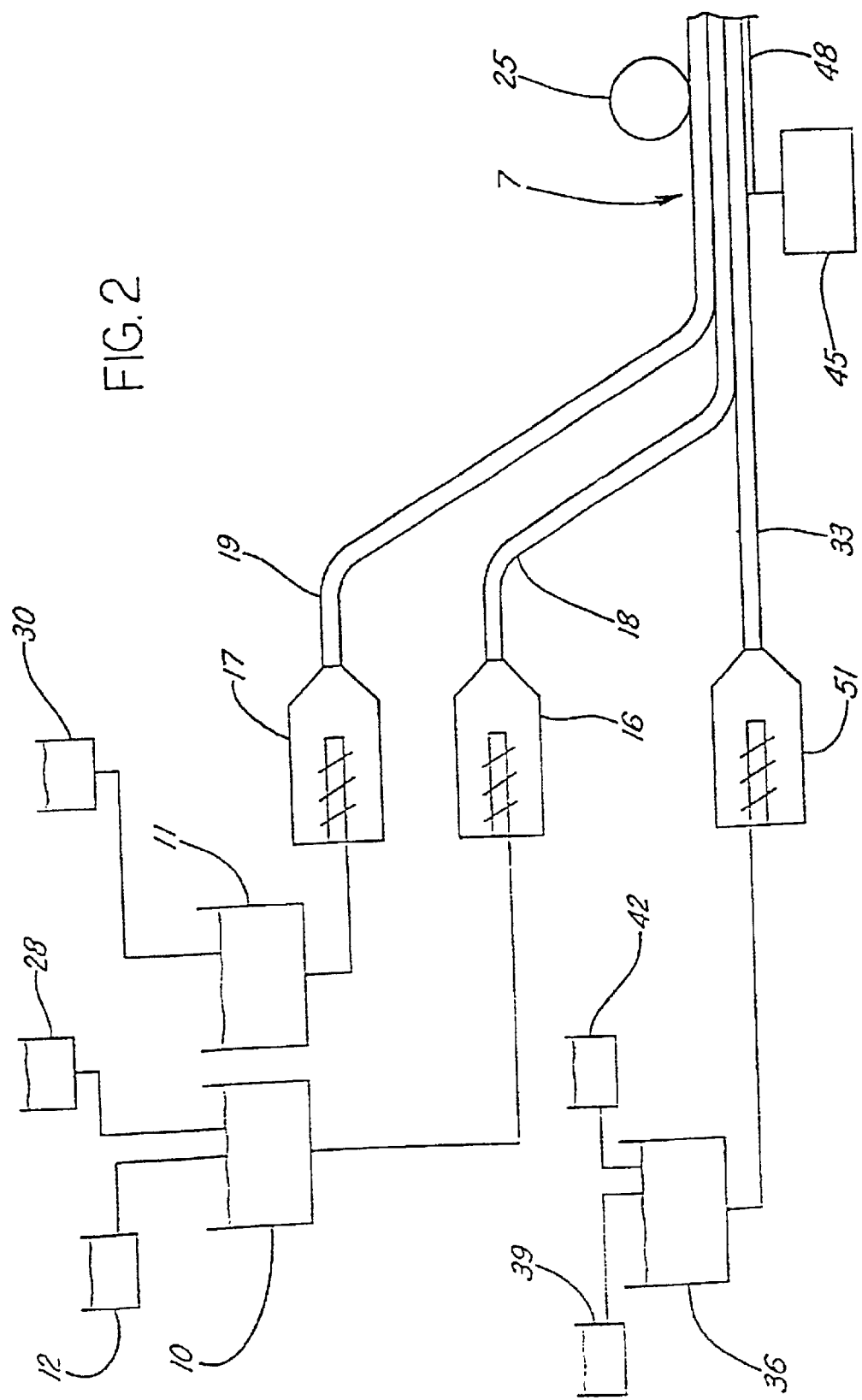
FIG. 2 is a schematic view of a process layout for producing the polymeric color coating according to the present invention.

The second material is extruded at a similar temperature to the first material and into a second layer 19 by a barrel extruder 17 and extruder die 55 (FIGS. 2 and 7). The thickness of the second layer 19 is between about 0.005 and about 0.010 inches. In most applications, including the contemplated auto body fascia, the transparent base of the second layer 19 does not include any pigmentation. However, if desired, a suitable pigment can be supplied to the second ionomer material tank 11 by a tank 30 to give a slight tint to the second layer 19. The tint may be provided to make a slight adjustment to the color of the coating 7.

The coating 7 may be a two-layer variety consisting solely of the film 8 (FIGS. 1 and 5) formed by first and second layers 18 and 19, or may include additional co-extruded ionomer based layers (as well as other polymer compositions compatible with the injection molded substrate). If the coating 7 is of a two-layer variety without a third backing layer, acceptable in some applications, compatibilizers can be added to the first layer 18 to allow it to adhere to a panel substrate.

As noted above, many applications may require the coating 7 to include a third layer 33 forming a backing for the film 8. A tank 36 holds the third polymeric material. The third material in tank 36 is fed to a barrel extruder 51 and the extruder die 55 to co-extrude the aforementioned third layer 33 with the first, second, and adhesive layers. The third polymeric material is rheologically compatible with the other layers of the coating including the first material, second material, and adhesive as well as sufficiently compatible with the polymeric substrate covered by coating 7. Notwithstanding the applicability of a polypropylene backing described above, the third material may consist of other materials, including ethylene or styrene, blended with compatibilizers when necessary. In order to increase the compatibility of the backing or third layer 33 relative to the ionomer layered film 8 as well as the overall consistency in the color appearance, scrap ionomer film may be added to the composition of the third material. While such blending may be used in instances, compatibilizers will generally adversely affect the melting point and stiffness of the polypropylene or other backing material and are therefore generally not desirable.

The third polymeric material is typically more opaque than the first material 18. In order to increase the color consistency of the coating 7, particularly during flop. In general, the opaqueness of the third layer is sufficient to prevent light penetration. This is particularly important for lighter colors where light may penetrate through the first colored layer 18. For example, tank 39 may be used to pigment the third material 33 to be more opaque than the first material 18 and to be either an on or off color with respect to the layer 18 depending on the desired final color. In other applications, the base material itself is opaque. Tank 42 will optionally provide a compatibilizer(s) to the third material tank 36, particularly in instances where an injected substrate will be used behind the coating 7. A typical thickness for the third material 33 will be approximately 0.010 to about 0.015 inches. The thickness of the third layer may be increased, up to about 0.200 inch or higher, in applications where it is desirable to eliminate back forming of a substrate.

The extrusion speeds for the first, second, and third layers 18, 19, and 33, respectively, are a function of, among other variables readily apparent to those skilled in the art, the material, type of color, quality requirements, equipment capacity, film thickness, and cost. Notwithstanding these variables, extrusion speeds on the order of 600 to 1200 pounds per hour (or higher) of total coating material described herein at a sixty inch width and 0.032 inch thickness are generally applicable for the contemplated vehicle fascia coating application. As is shown in FIGS. 7 and 8, the adhesive layer 48 and third backing layer 33 materials are preferably passed by separate barrel extruders to a common extrusion die 55 for co-extrusion with the material forming the first and second layers 18 and 19 to form the coating 7.

FIG. 7 illustrates the presence of a tank 20 for storing the optional adhesive for co-extrusion with the first, second, and backing layers where the adhesive layer 48 is desired. The tank 20 communicates with an extruder 53 that delivers the adhesive from the tank 20 from the die 55.

While a variety of extrusion processes may be used with the present invention, certain processes and machine components increase the quality of the coating to a degree that will enhance its commercial applications. These manufacturing enhancements generally relate to maintaining the moisture content of the ionomer base and additives such as the pigment and metallics, controlling the heating of the colored layer within the extrusion die, coating of the clear coat second layer, and storing the coating in sheets cut to predetermined lengths. The following sections describe, with reference to FIG. 7, the preferred processes for enhancing the benefits and functionality of the resulting coating through reducing surface imperfections such as pitting.

Surface imperfections, such as pitting, are of particular concern on the outermost surface of the coating, the clear coat second layer 19. Pitting may be minimized by reducing the moisture content and the number and/or size of globules of gel in the ionomer such as through drying or siphoning the ionomer to remove water and low molecular weight polymers or through the use of static mixers, breaker plates, and/or screens at the extruders. Gels are inherently formed within the ionomer during manufacturing. Vacuum processes that may be used to form the resulting coating for coupling to the fascia substrate generally exaggerate and stretch these tiny gels creating visually apparent surface imperfections.

Controlling the moisture content of the ionomer base and the additives, particularly in the second layer 19, minimizes the presence and size of the water globules thereby enhancing the surface quality of the coating 7 by reducing pitting and orange peeling. The ionomer base is preferably dried to a moisture content of about 500 parts per million (ppm) or less. The pigments, metallic flakes, or other additives to the ionomer base for the first layer 18 are dried to a moisture content of about 200 ppm or less. While various techniques for drying these respective compositions and delivering them to the extruders 16 and 17 (FIG. 7) may be used without departing from the scope of the invention, it is desirable to locate the dryers as close to the extruder hoppers as practical within the manufacturing environment. This proximity limits the potentially adverse affect of exposing the compositions to the ambient environment after drying. Moreover, while the compositions may be delivered to the extruders through a vacuum or gravity feed, vacuum feeding with an open loop system undesirably exposes the dryers and material to atmospheric conditions, including moisture laden air. In view of the above, it is desirable to place the dryers as close as practical to the extruder and to feed the material to the extruder hoppers or tanks by a gravity flow or, alternatively, through a closed loop vacuum delivery system. The gravity flow alternative is generally preferred due to its lower cost and ease of incorporation into the manufacturing process.

The drying time of the ionomer base and the other compositions are also important to an effective process. Drying of the compositions is generally a time consuming process that may limit the manufacturing speeds of the overall process. To eliminate the potential bottle-neck at the drying process, the dryers should have sufficient capacity to meet the process demands or, alternatively, be supplemented with a pre-dryer that accommodates a mass of the ionomer base, pigments, or other additives, so as to reduce the dwell time of the materials within the dryers.

As is best illustrated in FIG. 7, the extruders 16, 17, 51, and 53 are generally of a conventional design having a plurality of heated zones downstream of the hopper and a rotating screw that pushes the molten material forward through the various heated zones. One or more of a screen 66, breaker plate 68, and/or low shear mixer 70 may be positioned at the downstream extruder ends to enhance the back pressure within the extruder, increase the dispersion of the mixed elements, and reduce the size of the gel globules all while maintaining the integrity of the pigments and metallic flakes in the colored first layer. More particularly, while the gel globules tend to be small, they should be broken down into even smaller particle sizes so that they do not create a visual defect on the finished product. Several methods may be used to reduce gel sizes. Enhanced back pressure and shear may be used to stretch the gel globules beyond their yield point in the case of screens and shear mixers so that the globules divide into smaller particle sizes. Moreover, increased back pressure tends to mix the material and displace the gels from the slower velocity areas along the walls of flow passageways where the globules generally form or reside.

As is illustrated in FIG. 7, a breaker plate 68 is preferably included downstream of the screw extruders 16 and 17 for the colored first layer 18 and clear second layer 19 as well as screw extruders 51 and 53 for the third layer 33 and adhesive layer 48. A variety of commercially available breaker plates may be used with the present invention. Those skilled in the art will appreciate that the specific configuration and type of breaker plate will vary by material and the compression ratio of the screw extruder. For example, in the illustrated embodiment, the extruders for the first and second layers have a compression ratio of about 2:1 and the breaker plates provide a ninety percent reduction in flow area relative to the diameter of the extruder barrel. In order to provide more vigorous mixing of the material for the polypropylene third layer, the back pressure is further increased through the use of a screw compression ratio of 3.5:1 and a breaker plate flow area reduction of more than about ninety percent and preferably on the order of about ninety-five percent. In the adhesive layer, the screw compression ratio is about 2:1 and the breaker plate provides a flow reduction of approximately seventy percent.

As noted above, the flow area and configuration of the openings within the breaker plate may be varied for a particular application. In general, decreasing the overall flow area of the breaker plate increases the back pressure and corresponding mixing within the extruder. Conversely, smaller size openings may increase the shear to which the material is subjected to such a degree as to break-up or otherwise negatively impact the integrity of the pigments, metallics, or other additives to the material which is particularly important in the colored first layer 18.

A screen 66 is shown in the extruder line for the clear second layer 19 and the adhesive and backing layers 48 and 33. The screen increases shear to further enhance mixing and back pressure. The screen is preferably positioned upstream of and abutted against the breaker plate 68 so that the breaker plate provides structural support for the screen which may come in any commonly available sizes including, for example, forty, sixty, and eighty mesh sizes. The screen is preferably not used at the downstream end of the extruder 16 for the color layer, as the small openings may break the pigments or metallic flakes into smaller particles that adversely affect the coloring or appearance of the coating.

Finally, a static mixer 70 is preferably used with the backing 33 and first color layer 18 to provide a low shear flow impediment to increase back pressure and mixing without subjecting the material to unnecessary shear. The illustrated embodiment specifically contemplates the use of an interfacial surface generated (ISG) motionless mixer that is properly sized based on melt temperature, polymer rheology, targeted machine output, desired pressure drop, and engineered to create the proper amount of shear. More particularly, the preferred static mixer 70 imparts a maximum amount of shear to reduce the size of the high molecular weight plastic gels inherent in ionomers into microscopic sizes invisible to the naked eye. Notwithstanding the general applicability of any number of available static mixers, a three hole twisted ISG static mixer distributed by Mahr Corporation of Charlotte, N.C. has been found to perform satisfactorily for the specific example described herein.

As is further illustrated in FIG. 7, the backing layer extruder 51, adhesive extruder 53, and color layer extruder 16 all enter the extrusion die 55 from the rear center whereas the clear coat extruder 17 enters the die from the side. While this configuration is merely exemplary in nature, it illustrates the desirability of separating the first color layer from the second clear layer such that, as is illustrated in FIGS. 6 and 8, a heating element 52 may be positioned in operative engagement with the first colored layer 18 during extrusion. The element 52 preferably extends along the width of the die 55 and heats the upper surface of the color coat. This localized heating orients and aligns the reflective flakes to provide maximum reflectivity (FIG. 6). More particularly, the heated reflective flakes 54 become concentrated in the heated area thereby increasing the density of the flakes at the surface relative to the density throughout the first layer. The heating also tends to orient the flakes parallel to the upper surface of the first layer 18. This collection and orientation of metallic flakes 54, as well as the flow profile characteristics of the heated first layer material 18 within the die, is generally illustrated in FIG. 6. The concentration and laying down of the metallic flakes relative to the principle direction of flow achieves greater consistency and color matching which is apparent in 90° observations and, most particularly, during flop. By way of explanation, the parallel oriented particles minimize the opportunity for light to pass underneath and between the particles during flop. This effect minimizes the impact of the opaque third layer 33 on the overall color and also increases the consistency of the observed color and reflectivity of the metallic flakes.

The illustrated embodiment of the coating, including the co-extruded first, second, third, and adhesive layers 18, 19, 33, and 48, respectively, exits the die 55 and is passed to a roller assembly 76 (FIG. 8) having upper and lower heated rollers 78 and 80 and an intermediate cooled roller 82. The lower and intermediate rollers are separated from one another to form a gap 84 that controls the thickness of the resulting coating. In general, the thickness of the four layer coating is approximately 0.050 inches at the die exit 86. The size of the gap 84 may be varied to reduce this thickness, such as to approximately 0.032 inches. The temperature of the intermediate roller is preferably approximately 7020 F. while the heated lower roller is maintained at approximately 140° F. The cooled roller 82 contacts the upper surface of the coating, that is, the clear second layer 19, to provide a temperature shock that facilitates crystallization of the clear coat layer and increases its clarity. The heated upper and lower rollers 78 and 80 contact the third or backing layer 33 to maintain the elevated temperature and flexibility of the backing during manufacturing.

When the extruded coating 7 is passed from the upper roller 78, it is permitted to cool as it is transferred to a cutter. During cooling, various process control or product quality measurements may be performed, such as a measurement of the consistency of the color through the use of a X-Rite test or equivalent. After cooling and post process measurements, the continuous sheet of extruded coating 7 is preferably cut into predetermined lengths for storage and shipment. Cut sheets are preferred to rolling as cutting minimizes the stresses on the material prior to use. During processing, the continuous extruded sheet is maintained in tension. Storage and shipment of the sheets in a cut fashion permits the sheets to shrink prior to coupling to the body panel or fascia substrate. Conversely, if the stretch film is rolled for storage, much of the tension in the sheet is maintained in the material due to the compression of the rolled coating thereby preventing complete shrinkage during storage. Testing of a rolled coating shows longitudinal shrinkage of up to 50% and transverse shrinkage of approximately 3% after post storage and shipment processing. Conversely, at 350° F. the cut sheets shrink longitudinally on the order of only approximately 10% and transversely achieve approximately 2% growth after post storage and shipment processing. In general, at 220° F. longitudinal shrinkage of less than about 1.0% and transverse shrinkage of less than about 1.0% is preferred. The reduction of post storage and shipment shrinkage enhances the quality and stability of the resulting parts.

EXAMPLE

An exemplary embodiment of the present invention consists of a four layer co-extruded coating having, from top to bottom, a first colored layer, a second clear layer, an adhesive layer, and a third backing layer. The coating is color matched to a light almond pearl clear coat painted vehicle body. The polymeric base material used for the first and second layers is a 70% sodium hydroxide neutralized acrylic acid ionomer manufactured and distributed by Exxon under the trade name Iotek 8000. The ionomer is dried to a moisture content of 500 ppm and fed by gravity feed into the first chamber of a two-chambered hopper for the first color layer and to a tank for the second clear layer. The second chamber of the gravimetric feeder contains a color matched composition consisting of about 50% by weight of a carrier such as ethylene copolymer or other polymer compatible with ionomers mixed with about 25% of an appropriate pigment and 25% of alumina and/or mica flakes. The moisture content of the color matched composition is approximately 200 ppm. A gravimetric feeder blends the contents of the first and second hopper chambers at a ratio of about 12:1 (ionomer:color pigment) and feeds the blended material to a first extruder. The third backing layer material is a polypropylene manufactured and distributed by Exxon under the trade name PP7032 and is co-extruded with the first and second layers as described below. The adhesive layer is a styrene based adhesive manufactured and distributed by A. Shulman which is also co-extruded with the first, second, and third layers.

The temperature of the first, adhesive, and third materials as they are fed from their respective screw extruders to a Cloeren extruder die is 440, 490, and 460° F., respectively. The first, adhesive, and backing layers are fed to the die separately from the second layer and are passed in operative relationship with a conventional oil heater so as to heat the upper surface of the first layer. The heater is preferably maintained at a temperature of approximately 480° F. The die is configured to then join the second layer with the first, adhesive, and backing layers so that the four layers are co-extruded with one another. The resulting sheet is then passed through a roller assembly wherein the resulting coating has an overall thickness of approximately 0.032 inches, with the thickness of the first, second, adhesive, and backing layers being approximately 0.005, 0.009, 0.003, and 0.015 inches, respectively.

After cooling and curing, the coating has a scratch resistance equivalent or better than elastomeric paint, a surface gloss of approximately 88 degrees or higher, a clarity of approximately 3.0 haze number or lower, and an overall flexural modulus of about 200 ksi.

Figure 3:
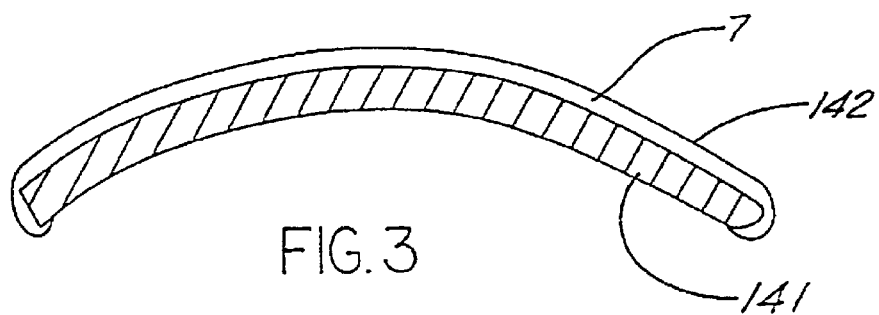
FIG. 3 is a side sectional view of an exterior body panel utilizing the color coating of the present invention having a metallic self-supporting member.

A variety of processes may be used to modify the profile of the coating 7 prior to coupling to the substrate to form the body panel or fascia. For example, referring to FIG. 3, a body panel 142 is shown utilizing a coating 7 according to the present invention. The body panel includes a self-supporting, plastic or fiberglass reinforced polymer 141 as the fascia substrate. The coating 7 is vacuum formed and the injection molded polymer 141 is then shot on the back side of the coating. For example, as is consistent with known processes, the vacuum formed coating 7 may be installed into a substrate mold, pinned into position, and the substrate shot into the mold at a temperature that is preferably greater than the melt temperature of the exposed coating layer (generally the backing or third layer 33) so as to provide an intermelt-type bond and suitable adherence between the coating and substrate.

Figure 4:
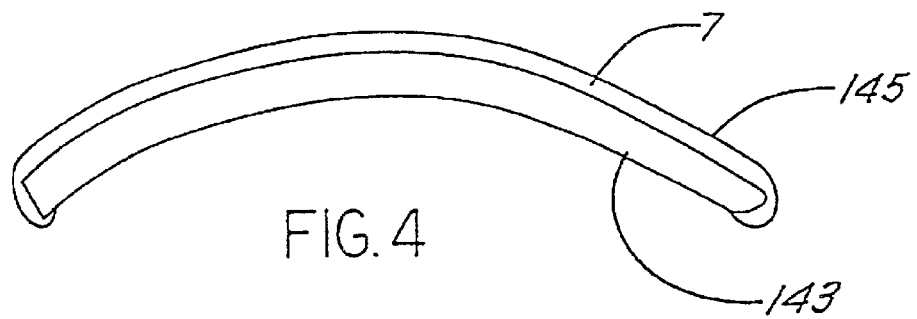
FIG. 4 is a view similar to that of FIG. 3 illustrating an embodiment of the present invention with a body panel having a polymeric substrate self-supporting member.

In a similar manner best shown in FIG. 4, a polymeric substrate injection formed member 143, which can be plastic or plastic reinforced by fiberglass or other suitable filament, has an adjacent coating 7 forming its skin. Those skilled in the art will appreciate that the above discussed assembly processes are exemplary in nature and that the invention has sufficiently widespread applicability and manufacturing flexibility to permit process modifications generally apparent to those skilled in the art.

A major advantage of the present invention is that panels 142 and 145 (FIGS. 3–4) can be utilized on a vehicle or other article together or separately without worrying about the matching of the paint on the remainder of the article body. Prior to the present invention, if a polymeric substrate self-supporting member such as member 143 were placed on a nonmetallic substrate, the paint on the substrate would have to be adjusted in color to match the paint on the remaining metallic exterior vehicle body panels. However, since the third layer 33 of the coating 7 is opaque in the subject application, the primary concern is that the pigmentation on the second layer 19 and the third layer partial) matches that on the clear coat body. As previously mentioned, in some applications, it may be desirable to slightly tint the second layer 19 to help match the color of the remainder of the car body.

The polymeric coating of the present invention has been particularly described herein with reference to an automotive vehicle body panel such as a fascia. However, as has been previously mentioned, the invention is applicable to a wide array of other articles of manufacture including other vehicles and colored plastic articles such as, but not limited to, trucks, appliances, boats, telephones, computer covers, desktops, canoes, personal watercraft, airplanes, ships, and building structures. Further, while the particular performance characteristics of the coating (most notably the transparency and scratch and mar resistance of the transparent base of the first and second coating layers) have been described herein with reference to the environments to which an automotive vehicle body may be subjected during operation, the environments to which other articles of manufacture may be subjected to during use may permit the co-extruded colored polymeric coating to be formed of a variety of suitable materials as generally discussed herein. In view of the above, it will be apparent to those skilled in the art that various modifications can be made to the present invention without departing from the spirit or scope of the present invention as it is encompassed in the specification and drawings and by the following claims.

What is claimed is:

1. A method of producing a colored coating for an article comprising:
   pigmenting a first supply of clear base polymeric material to a desired color;
   adding reflective metallic flakes to the first supply of polymeric coating material;
   extruding the pigmented first supply of polymeric coating material into a first layer;
   heating an upper surface of the first layer to concentrate the reflective flakes toward the upper surface of the first layer; and
   extruding a second supply of transparent clear base polymeric coating into a second layer, said second layer being co-extruded with said first layer.

2. A method of producing a colored coating for an article as described in claim 1, wherein the transparent base of the second layer has a clarity when cured of about 3.0 haze number or lower.

3. A method of producing a colored coating for an article as described in claim 2, wherein the transparent base of the second layer has a scratch and mar performance that is substantially equal to or superior to the performance of an elastomeric paint.

4. A method of producing a colored coating for an article as described in claim 3, wherein the transparent base of the first and second layers is selected from the group of polymers consisting of acrylics, Polyvinylidene Fluorides, urethanes, polycarbonates, and ionomers.

5. A method of producing a colored coating for an article as described in claim 4, wherein the transparent base of the second layer is an ionomer.

6. A method of producing a colored coating for an article as described in claim 5, wherein the transparent base of the first layer is an ionomer.

7. A method of producing a colored coating for an article as described in claim 1, wherein the second supply of clear base polymeric material has a scratch and mar performance that is substantially equal to or superior to the scratch and mar performance of an elastomeric paint.

8. A method of producing a colored coating for an article as described in claim 7, wherein the first and second supply of clear base polymeric material are ionomers.

9. A method of producing a colored coating for an article as described in claim 1, further including drying the reflective flakes to a moisture content of less than 200 ppm before adding the reflective flakes to the first supply of polymeric coating material.

10. A method of producing a colored coating for an article as described in claim 1, further including passing the first supply of polymeric coating material into an extrusion die and heating an upper surface of said first polymeric coating material in said die before co-extrusion with said second layer.

11. A method of producing a colored coating for an article as described in claim 1, wherein the step of pigmenting a first supply of clear base polymeric material to a desired color includes drying the polymeric material to a moisture content of less than about 500 ppm, drying pigments to a moisture content of less than about 200 ppm, and mixing the pigments with the first supply of clear base polymeric material.

12. A method of producing a colored coating for an article as described in claim 1, further including co-extruding a third supply of polymeric material with said first layer generally opposite said second layer, said third layer being more opaque than said first layer of polymeric material.

13. A method of producing a colored coating for an article as described in claim 1, wherein said co-extruded first, second, and third polymeric materials form a coating sheet and further including cutting the sheet into segments for flat storage.

14. A method of producing an article with a colored polymeric coating comprising:
   producing a coating having a first layer of polymeric coating material disposed between a second layer of polymeric coating material and a third layer of polymeric material, including
   pigmenting a first supply of transparent base polymeric material to a desired color;
   adding reflective metallic flakes to the first supply of polymeric coating material;

extruding the pigmented first supply of transparent base polymeric coating material into a first layer;

heating an upper surface of the first layer to concentrate the reflective flakes toward the upper surface of the first layer;

extruding a second supply of transparent base polymeric coating into a second layer, said second layer being co-extruded with said first layer; and coupling the coating to an article substrate so that said first layer of polymeric material is between said substrate and said second layer of polymeric coating material.

15. A method of producing an article with a colored polymeric coating as described in claim 14, wherein the step of producing a coating further includes co-extruding a third supply of polymeric material with said first and second layers, said third supply of polymeric material being more opaque than said first layer of polymeric material, said first layer positioned between said third layer and said second layer.

16. A method of producing an article with a colored polymeric coating as described in claim 14, wherein the transparent base of the polymeric coating material of said first and second layers is selected from the group of polymers consisting of acrylics, Polyvinylidene Fluorides, urethanes, polycarbonates, and ionomers.

17. A method of producing an article with a colored polymeric coating as described in claim 14, wherein the transparent base polymeric material of the first and second layers are ionomers.

* * * * *